United States Patent
Gupta et al.

(10) Patent No.: US 10,779,042 B1
(45) Date of Patent: Sep. 15, 2020

(54) AUTOMATICALLY GENERATED PERSONALIZED MEDIA CHANNEL

(71) Applicant: Alphonso Inc., Mountain View, CA (US)

(72) Inventors: Manish Gupta, Bangalore (IN); Lampros Kalampoukas, Brick, NJ (US); Raghavendra Koushik, Bangalore (IN); Subbhaash S, Bangalore (IN)

(73) Assignee: Alphonso Inc., Mountain View, CA (US)

( * ) Notice: Subject to any disclaimer, the term of this patent is extended or adjusted under 35 U.S.C. 154(b) by 0 days.

(21) Appl. No.: 16/299,950

(22) Filed: Mar. 12, 2019

Related U.S. Application Data

(60) Provisional application No. 62/789,165, filed on Jan. 7, 2019.

(51) Int. Cl.
| | |
|---|---|
| H04N 21/466 | (2011.01) |
| H04N 21/442 | (2011.01) |
| H04N 21/24 | (2011.01) |
| H04N 21/458 | (2011.01) |
| H04N 21/234 | (2011.01) |
| H04N 21/438 | (2011.01) |
| H04N 21/25 | (2011.01) |

(Continued)

(52) U.S. Cl.
CPC ... *H04N 21/4668* (2013.01); *H04N 21/23418* (2013.01); *H04N 21/24* (2013.01); *H04N 21/2407* (2013.01); *H04N 21/25* (2013.01); *H04N 21/251* (2013.01); *H04N 21/252* (2013.01); *H04N 21/258* (2013.01); *H04N 21/25891* (2013.01); *H04N 21/262* (2013.01); *H04N 21/26258* (2013.01); *H04N 21/26275* (2013.01); *H04N 21/4383* (2013.01); *H04N 21/44204* (2013.01); *H04N 21/44222* (2013.01); *H04N 21/458* (2013.01)

(58) Field of Classification Search
None
See application file for complete search history.

(56) References Cited

U.S. PATENT DOCUMENTS

| | | | |
|---|---|---|---|
| 10,108,718 B2 | 10/2018 | Kalampoukas et al. | |
| 2005/0198686 A1* | 9/2005 | Krause | H04L 29/06027 725/118 |

(Continued)

FOREIGN PATENT DOCUMENTS

| | | |
|---|---|---|
| KR | 20040000632 A | 1/2004 |

*Primary Examiner* — Justin E Shepard
(74) *Attorney, Agent, or Firm* — Panitch Schwarze Belisario & Nadel LLP

(57) ABSTRACT

Systems and methods are provided to generate a personalized video channel for a viewer. Selected parameters of the viewer's viewing behavior with respect to one or more media devices that are associated with the viewer are automatically monitored and detected during one or more sampling periods. Media content sources that are available to the viewer on the one or more media devices are automatically detected. A personalized video channel is then generated for the viewer using at least the monitoring parameters and the detected media content sources. During a viewing session on one of the media devices, the generated personalized video channel is displayed.

21 Claims, 9 Drawing Sheets

(51) Int. Cl.
*H04N 21/258* (2011.01)
*H04N 21/262* (2011.01)

(56) References Cited

U.S. PATENT DOCUMENTS

| | | | |
|---|---|---|---|
| 2006/0156341 A1* | 7/2006 | Kim | H04N 7/163 |
| | | | 725/48 |
| 2007/0157237 A1* | 7/2007 | Cordray | H04H 60/65 |
| | | | 725/42 |
| 2015/0052115 A1* | 2/2015 | Sharifi | G06Q 30/0631 |
| | | | 707/722 |
| 2016/0142783 A1* | 5/2016 | Bagga | H04N 21/47214 |
| | | | 725/47 |
| 2016/0275458 A1* | 9/2016 | Meushar | G06Q 10/109 |
| 2017/0070789 A1* | 3/2017 | Liassides | H04N 21/812 |

\* cited by examiner video content database 40 viewer 1

| Identifier of video content | Type of video content/Source | Description of video content | Date/Time of viewing | Primary Metadata (Content Details) | Secondary Metadata (Content Details) |
|---|---|---|---|---|---|
| 222333333 | Program/ NBC HD | NBC TODAY show 12-3-2018 | Monday, December 3, 2018 7:10 am-7:30 am | NBC TODAY show 12-3-2018 | daily live broadcast Al Roker Ann Curry, Natalie Morales Willie Geist |
| 334443332 | Program/ CBS HD | BIG BANG THEORY Season 4, Episode 10 | Monday, December 3, 2018 7:30 am-8:00 am | BIG BANG THEORY Season 4, Episode 10 | sitcom Kaley Cuoco Mayim Bialek |
| 444555343 | Program/ Amazon Prime | The Marvelous Mrs. Maisel Season 1, Episode 4 | Monday, December 3, 2018 8:00 pm-9:00 pm | The Marvelous Mrs. Maisel Season 1, Episode 4 | comedy-drama |
| 222333334 | Program/ NBC HD | NBC TODAY show 12-4-2018 | Tuesday, December 4, 2018 7:10 am-7:30 am | NBC TODAY show 12-4-2018 | daily live broadcast Al Roker Ann Curry, Natalie Morales Willie Geist |
| 334443334 | Program/ CBS HD | BIG BANG THEORY Season 4, Episode 11 | Tuesday, December 4, 2018 7:30 am-8:00 am | BIG BANG THEORY Season 4, Episode 11 | sitcom Kaley Cuoco Mayim Bialek |
| 444555344 | Program/ Amazon Prime | The Marvelous Mrs. Maisel Season 1, Episode 5 | Tuesday, December 4, 2018 8:00 pm-9:00 pm | The Marvelous Mrs. Maisel Season 1, Episode 5 | comedy-drama |

Figure 2B media source database 42

| Network/channel | over-the-top" (OTT) media services |
|---|---|
| viewer 1 | |
| NBC HD<br>CBS HD<br>ESPN HD<br>.. .. | FIOS VOD<br>Netflix<br>Hulu<br>Amazon Prime<br>.. .. |
| viewer 2 | |
| NBC HD<br>CBS HD<br>.. .. | Comcast Xfinity VOD<br>.. .. |
| viewer n | |
| .. .. | .. .. |

Figure 2C

Personalized video channel (table 46)

viewer 1

MyTVChannel

Date: January 5, 2019

| Time | Program content | Program content source |
|---|---|---|
| 7:00 am | None (blank) | |
| 7:10 am | NBC Today Show (live) | NBC |
| 7:30 am | BIG BANG THEORY Season xx, Episode xx | CBS |
| 8:00 am | None (blank) | |
| ... | ... | |
| 8:00 pm | The Marvelous Mrs. Maisel Season xx, Episode xx | Amazon Prime |
| 9:00 pm | None (blank) | |
| ... | ... | |

Figure 2D

Personalized video channel (table 46)

viewer 1

MyTVChannel

Date: January 5, 2019

| Time | Program content | Program content source |
|---|---|---|
| 7:00 am | *RECOMMENDED PROGRAM CONTENT* | |
| 7:10 am | NBC Today Show (live) | NBC |
| 7:30 am | BIG BANG THEORY Season xx, Episode xx | CBS |
| 8:00 am | *RECOMMENDED PROGRAM CONTENT* | |
| . . . | . . . | |
| 8:00 pm | The Marvelous Mrs. Maisel Season xx, Episode xx | Amazon Prime |
| 9:00 pm | *RECOMMENDED PROGRAM CONTENT* | |
| . . . | . . . | |

Figure 2E

Date: Monday, January 7, 2019

| EPG of viewer-available channels that are in viewer's personalized MyTVChannel |||||| MyTVChannel ||
|---|---|---|---|---|---|---|---|
| Time | NBC | ABC | Weather Channel | Amazon Prime | MyTVChannel program contents | MyTVChannel viewing times |
| 7:00 am | TODAY show (live) | Good Morning America (live) | continuous | None (on-demand) | | 7:00 am |
| | | | | | Weather Channel | 7:10 am |
| | | | | | TODAY show | 7:20 am |
| | | | | | Good Morning America | 7:40 am |
| | | | | | | 7:55 am |
| 8:00 am | TODAY show (live) *continued* | Good Morning America *continued* | continuous | None (on-demand) | | 8:00 am |
| 9:00 am | TODAY show (live) *continued* | | continuous | None (on-demand) | | 9:00 am |
| 10:00 am | | | | | | 10:00 am |
| ⋮ | ⋮ | | | | | ⋮ |
| 8:00 pm | America's Got Talent | The Bachelor *continued* | continuous | None (on-demand) | The Marvelous Mrs. Maisel Season xx, Episode xx | 8:00 pm |
| 9:00 pm | America's Got Talent *continued* | The Bachelor *continued* | continuous | None (on-demand) | | 9:00 pm |
| 10:00 pm | | | | | | 10:00 pm |
| ⋮ | ⋮ | | | | | ⋮ |

Figure 2F

AUTOMATICALLY GENERATED PERSONALIZED MEDIA CHANNEL

CROSS-REFERENCE TO RELATED APPLICATIONS

This application claims priority to U.S. Provisional Patent Application No. 62/789,165 filed Jan. 7, 2019, which is incorporated by reference herein.

BACKGROUND OF THE INVENTION

When a media consumption device, such as a television (TV) or radio is turned on, it is typically tuned to the last channel or station that the viewer or user watched or listened to. In the case of a TV, if the viewer wishes to watch another channel or source of program content, the viewer must operate a remote control device to tune away from the current channel to the desired channel or source of program content. Alternatively, the viewer will use the remote control device to navigate through (i) an electronic program guide (EPG) to find a channel of interest, or (ii) a catalog of one or more OTT media services (e.g., video-on-demand (VOD), Netflix®, Hulu®) to find a source of program content.

Many media consumers have highly predictable media consumption behaviors. For example, many TV viewers only watch TV at certain times of the day, especially during weekdays, and typically watch the same TV shows and program content during these respective times of day. Evening viewing behaviors typically differs from morning viewing behaviors. Viewers will thus typically need to perform the channel switching and channel surfing activities described above, often multiple times per day. It would be desirable if these activities could be minimized, thereby improving the user's media consumption experience. The present invention fulfills such a need by providing a new paradigm of program content selection and presentation that operates in parallel with existing processes.

Many media platforms present program content recommendations using periodic pop-up messages and the like. These recommendations are often based on previous media consumption. To act on such messages, the user must navigate away from their current program content, and must also remember the message, if it is no longer on the display screen when the user wishes to act on it. The present invention also provides a new paradigm of program content selection and presentation for handling such recommendations.

SUMMARY OF THE PRESENT INVENTION

Systems and methods are provided to generate a personalized video channel for a viewer. Selected parameters of the viewer's viewing behavior with respect to one or more media devices that are associated with the viewer are automatically monitored and detected during one or more sampling periods. Media content sources that are available to the viewer on the one or more media devices are automatically detected. A personalized video channel is then generated for the viewer using at least the monitoring parameters and the detected media content sources. During a viewing session on one of the media devices, the generated personalized video channel is displayed.

BRIEF DESCRIPTION OF THE DRAWINGS

Preferred embodiments of the present invention will now be described by way of example with reference to the accompanying drawings:

FIGS. 2A-1 and 2A-2, taken together, is a schematic diagram of a system for implementing preferred embodiments of the present invention.

FIGS. 2B-2G are database tables used in the system of FIGS. 2A-1 and 2A-2.

DETAILED DESCRIPTION OF THE INVENTION

Figure 1:
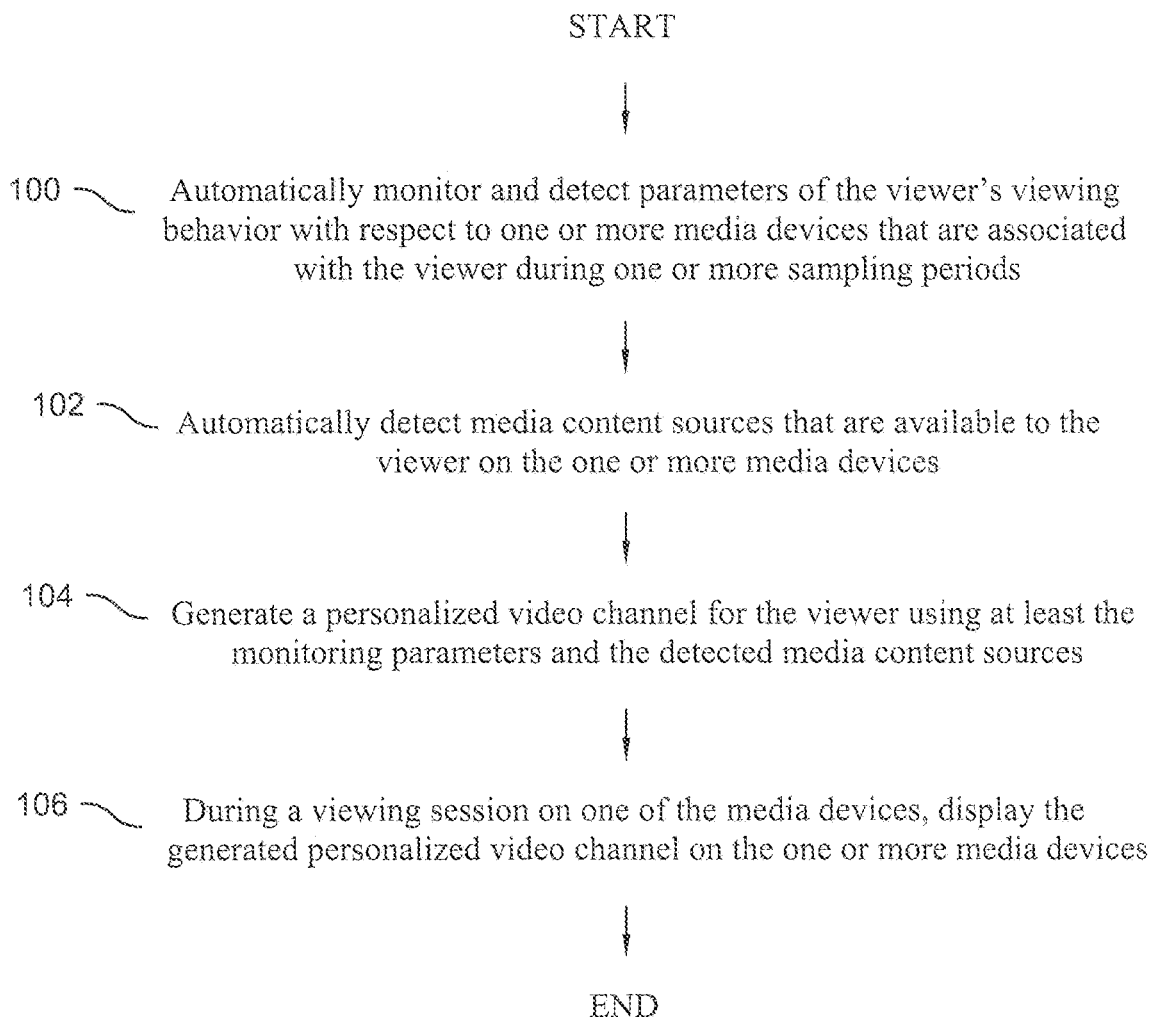
FIG. 1 is a flowchart for implementing one preferred embodiment of the present invention.

Certain terminology is used herein for convenience only and is not to be taken as a limitation on the present invention.

The words "a" and "an", as used in the claims and in the corresponding portions of the specification, mean "at least one."

I. Definitions

The following definitions are provided to promote understanding of the present invention.

media content—Media content is the information and experiences that are directed towards an end-user or audience, namely media consumers. In the context of the present invention, the media content is delivered via a media device and primarily includes program type content and commercials. The media content may come from (i) a conventional broadcast TV signal, typically delivered over a cable or fiber optic network via a set top box, CableCARD® or the like to a TV, (ii) an over-the-air (OTA) broadcast TV signal, or (iii) streaming services that deliver audio and/or audiovisual content to a device that is connected to a viewer's home network. The media content includes audio or audiovisual content, and thus may be any content in a video data stream or an audio data stream.

media device—A media device is any device that outputs media content, such as a television, radio, or computer. A media device thus allows for consumption of media content. Examples of media devices that output both video-based media content and audio-based media content include a smart TV, and a smart multi-media player device.

media channel (also, referred to interchangeably as a "media content source" or a "program content source")—A media channel is the source for the media content. The media channel may be a TV channel, a radio station, or a media service. The media channel may be referred to by a number (e.g., Channel 4, Channel 650) that is mapped to a media content source, a network name (e.g., NBC, ESPN®) that is an abbreviation or branding name for the media content source, or a streaming source (e.g., Netflix, Hulu). The media channel may also be an "over-the-top" (OTT) media service, such as video-on-demand (VOD), Netflix, or Hulu. OTT provides on-demand streaming.

video channel—A video channel is a media channel that provides audio-visual media content.

audio channel—An audio channel is a media channel that provides audio-only media content.

video data stream (also, referred to interchangeably as a "TV stream" and a "TV channel stream")—A video data stream includes (i) a conventional broadcast TV signal, typically delivered over a cable or fiber optic network via a set top box, CableCARD® or the like to a TV, (ii) an over-the-air (OTA) broadcast TV signal, and (iii) streaming services that deliver video content to a TV device that is connected to a viewer's home network. A video data stream may also be referred to as a "stream of audiovisual data" or an "audiovisual stream" since a video data stream typically includes audio.

audio data stream—An audio data stream includes (i) a conventional broadcast audio signal, such as AM/FM or satellite radio, or (ii) streaming services that deliver audio content to a user's device that is connected to a network.

video content—Video content refers to the content of the video data stream. Two main categories of video content include "program type content" (e.g., a TV show) and commercials.

time slots of viewing activity—A time slot of viewing activity identifies a time period wherein there is continuous media consumption. For example, a viewer may turn on their TV every weekday morning at about 7:10 am, watch one or more channels until about 8:00 am, and then turn the TV off. The viewer may resume TV watching at about 8:00 pm, and watch one or more channels until about 10:00 pm, and then turn the TV off. In this example, the time slots of viewing activity are weekdays between 7:10 am-8:00 am, and 8:00 pm-10:00 pm. Each time slot includes one or more consecutive time window. See FIG. 2G, described below.

time window (also, referred to interchangeably as a "viewing time window")—A time window is a period of viewing time within a time slot wherein specific program contents occurs. In the example, above, time slots of viewing activity may be weekdays between 7:10 am-8:00 am, and during that time slot, the viewer initially watches 10 minutes of weather on the Weather Channel from 7:10 am-7:20 am, followed by 40 minutes of NBC's TODAY show from 7:20 am-8:00 am, and then turns the TV off. Thus, there is only one time slot, but there are two distinct time windows, because two different program contents were tuned to. If the viewer only watched the TODAY show for the entire 50 minutes, then there would be one time slot, and also only one time window. Thus, a time slot may have one or more consecutive time windows. As shown in these illustrations, a time window may also be shorter than the airing time of the program content that is in the time window. In the NBC TODAY show example, the viewer only watched 40 minutes of a 3 hour program. See FIG. 2G, described below.

unused channel—An unused channel is a channel of a TV receiver or cable box device that does not receive any program contents if the user tunes to the channel. For example, cable systems broadcast using two, three and four digit channels. However, there are many channels that are not used. An unused channel may be any of those channels.

originally unused channel—An originally unused channel is a channel that initially does not receive any program contents if the user tunes to the channel. As described herein, in one preferred embodiment, an originally unused channel may become used as a personalized video channel, which would then show whatever viewer-personalized program content it was programmed to show.

commercial (also, referred to interchangeably as an "advertisement" or "ad")—A "commercial" is an advertisement for a product or service, and also includes advertising for program type content, known in the TV industry as a "promo." A commercial is thus distinguishable from "program type contents" or "program content."

commercial break (also, referred to interchangeably as a "block of commercial content," "commercial block," "ad block," or "ad pod")—Each commercial break includes a plurality of successive individual commercials. That is, the commercials are aired back-to-back in a set or group. Commercial breaks are interspersed during a TV program. The total length of the commercial breaks aired during a TV show is almost always significantly shorter than the length of the TV show. Likewise, the length of one commercial break is almost always significantly shorter than the lengths of the TV show segments that precede and follow the commercial break. A typical broadcast TV channel airs about 20 minutes of commercial content per hour.

metadata—Metadata, by definition, is data (information) that provides information about other data. The metadata described below is generally "descriptive metadata," which by definition, describes a resource for purposes such as discovery and identification. It can include elements such as title, abstract, author, and keywords. More specifically, the metadata described below is metadata related to specific TV content. The metadata includes both "primary metadata" and "secondary metadata" (described below). Metadata are also referred to as "tags."

primary metadata—In the case of a TV program, "primary metadata" is metadata regarding the TV program that directly identifies the TV program, such as the title, and the season and episode in the case of a recurring TV program series. Other objective data regarding the TV program may be part of the metadata, such the actors, and network airing the TV program. In the case of a movie, the "primary metadata" may include similar information, such as the movie title and actors.

secondary metadata—"Secondary metadata" is any other metadata regarding the TV program, movie, or commercial other than the primary metadata. For example, in a TV program, "Curb Your Enthusiasm" is primary data, whereas "comedy" (genre) or "Los Angeles" (where it is primarily filmed) may be secondary metadata. In a movie, "Mean Girls" is primary data, whereas "teen comedy" (genre) may be secondary metadata.

video display device—The video display device is the device that the viewer uses to experience the video content 14. Examples of a video display device include a smart TV, or a smart multi-media player device, such as a tablet or a smartphone. A smart TV is a television set with integrated Internet capabilities that offers more advanced computing ability and connectivity than a contemporary basic television set. Smart TVs and smart multi-media player devices are also referred to as "information appliances," and often allow the user to install and run more advanced applications or plug-ins/add-ons based on a specific platform. Smart TVs and smart multi-media player devices run a complete operating system (OS) or mobile OS software that provides a platform for application developers.

device identifier (device ID)—a device ID is equivalent to a "MAC address" or "physical address" which is unique for every device. The device may be a mobile device. A device ID is typically fixed, but in the case of mobile devices, their device ID's are now user-resettable. A sample device ID (ESN/IMEI/MEID) for an Iphone® 5 is: 990002286593860. Smart TV's, and smart multi-media player devices also have unique device ID's.

related program content—"Related" program content refers to the relationship between the program contents that are monitored and detected during one or more sampling periods, and the program contents that are selected for building the viewer's personalized video channel. Examples of "related program contents" include the same program content, but the current day's version of the program content (e.g., current live version of NBC's TODAY show); the same program content, but the next episode of the same program content (e.g., SEINFELD, episode <my next episode>). Program content may be related in other ways, such as by having similar metadata, such as the same genre (e.g., live football, teen comedy).

recommended program content—"Recommended" program content is a more general category of program content than "related" program content. Recommended program content is not necessarily related to the viewer's previously watched program content, or any metadata associated therewith. For example, recommended program content may simply be the most popular TV programs or movies at the present time, or the most highly rated TV programs or movies at the present time. However, recommended program content may also be "recommended for you" because the recommendations are based on similar parameters which are used to identify related program content.

II. Overview of Preferred Embodiments

FIG. 1A shows a flowchart of one preferred embodiment of the present invention which provides an automated method of generating a personalized video channel for a viewer. In one preferred embodiment, the method operates as follows:

STEP 100: Automatically monitor and detect parameters of the viewer's viewing behavior with respect to one or more media devices that are associated with the viewer during one or more sampling periods. The parameters include at least (i) time slots of viewing activity (Viewing Time-Slots), each time slot including one or more consecutive viewing time windows (Viewing Time-Windows), and (ii) program contents during the time slots of viewing activity, wherein the program contents during each consecutive viewing time window is detected. A change in program contents occurs within each time window of a time slot.

STEP 102: Automatically detect media content sources that are available to the viewer on the one or more media devices. The media content sources include both broadcasting media content sources, and on-demand media content sources.

STEP 104: Generate a personalized video channel for the viewer using at least the monitoring parameters and the detected media content sources. The personalized video channel is populated with program contents for at least some of the viewing time slots that were detected during the monitoring as having viewing activity. The program contents for the viewing time slots of the personalized video channel are related to the program contents detected during the monitoring for the respective viewing time slots. Examples of "related program contents" include the same program content, but the current day's version of the program content, and the same program content, but the next episode of the same program content.

STEP 106: During a viewing session on one of the media devices, display the generated personalized video channel on the one or more media devices by automatically tuning to one of the media content sources that is currently presenting, or has available to present, the program contents that the personalized video channel was populated with for the viewing time slot that matches the current time, thereby allowing the viewer to experience the personalized video channel.

III. Detailed Disclosure of Preferred Embodiments

Figures 1, 2A:
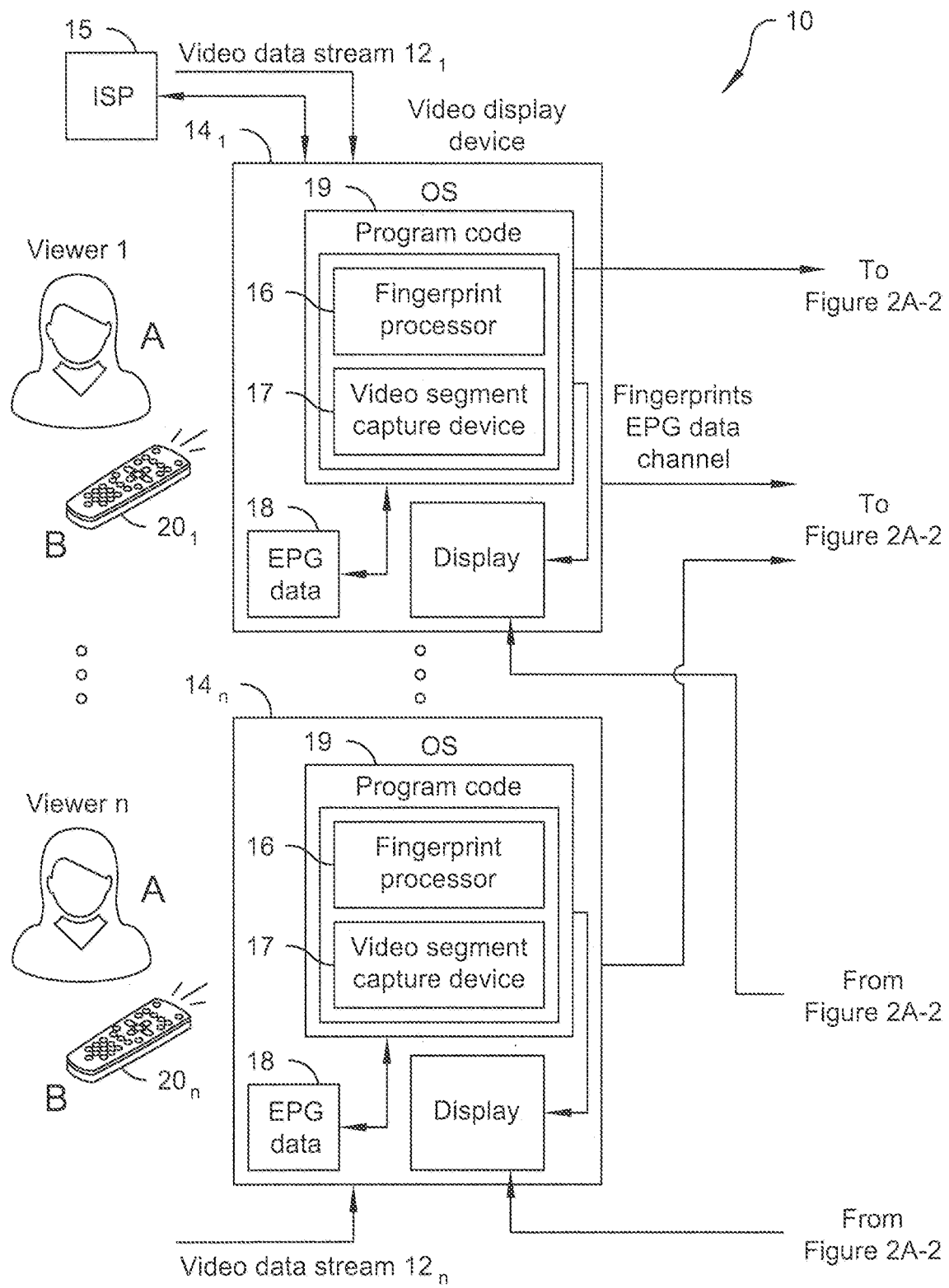
Figures 2, 2A:
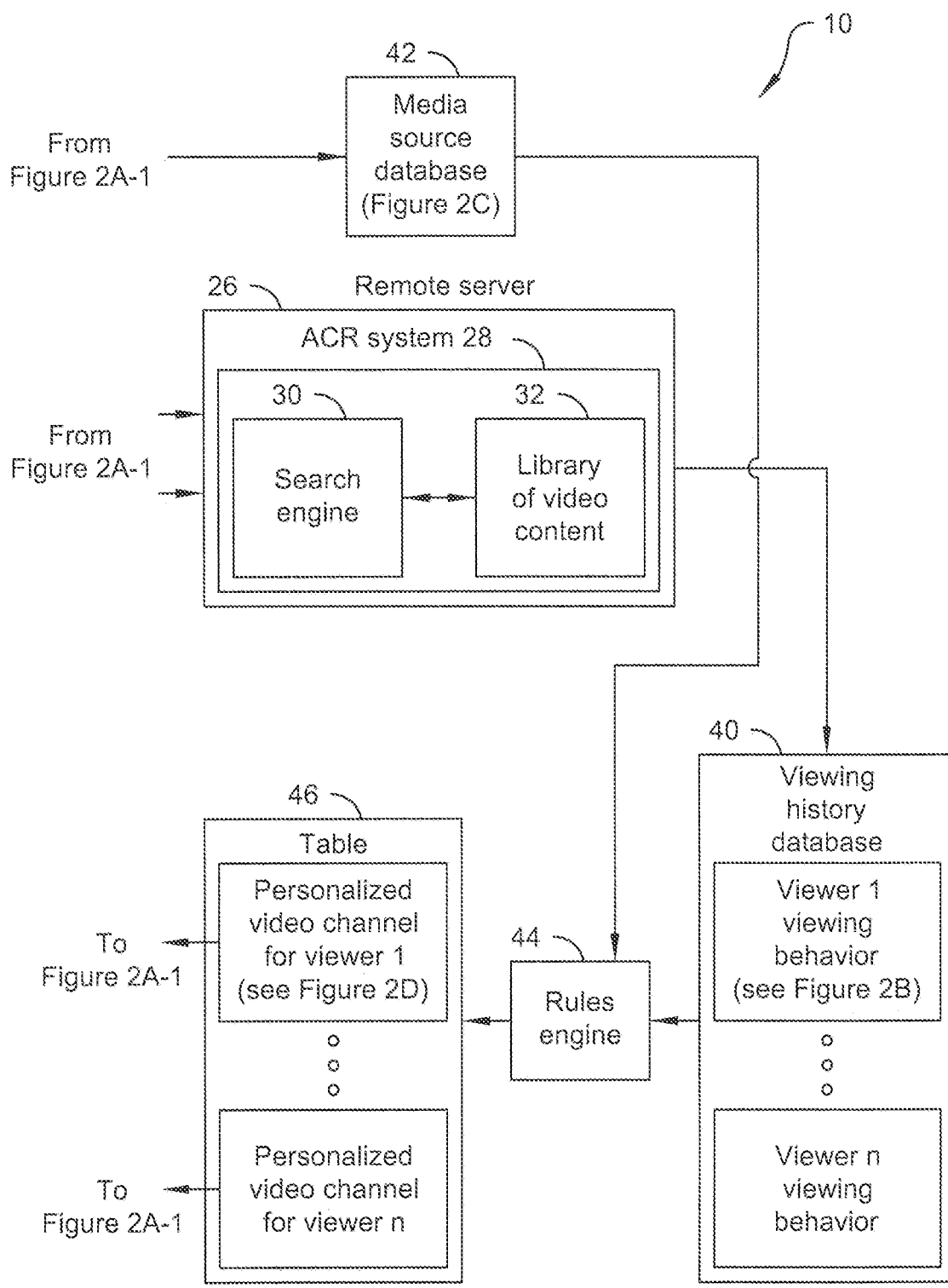

FIGS. 2A-1 and 2A-2, taken together, is a schematic diagram of a system 10 for implementing one preferred embodiment of the present invention, including the processes of FIGS. 1A and 1B. A TV channel feed or streaming media feed (hereafter, collectively referred to as a "video data stream 12") is received by a video display device 14. As described above, the video display device 14 may be a smart TV, or a smart multi-media player device, such as a tablet or a smartphone. The video display device 14 may interface with one or more intermediary devices (not shown), such as a set top box (STB), CableCARD®, or the like for receiving a broadcast TV signal as the video data stream 12, or a streaming media device or app, such as ROKU®, Hulu®, or Netflix®, for receiving video data as the video data stream 12 from a streaming service (not shown). In another embodiment, the functionalities of the one or more intermediary devices are built into the video display device 14, as is well-known in the art with respect to many types of smart TV's.

FIGS. 2A-1 and 2A-2 shows a plurality of viewers 1-$n$, each controlling their respective video display devices $12_1$-$12_n$ with their respective user input devices $20_1$-$20_n$. The explanation below is provided with respect to viewer 1, but it should be understood that each viewer has similar functionality as viewer 1.

The video display device 14 includes a fingerprint processor 16, and, optionally, EPG data 18 that is captured from a conventional electronic program guide (not shown) which is available from the source of the video data stream 12, such as a cable service provider, or independent third-party sources, such as tvguide.com. As is well-known in the art, the fingerprint processor 16 may be used to create one or more fingerprints from a segment of video content. The fingerprints may be audio and/or video fingerprints.

The video display device 14 also includes a connection to an Internet Service Provider (ISP) 15, or an equivalent entity for accessing resources that may be required by a smart appliance, and for accessing OTT media services, and sources of EPG data. In most households that subscribe to a cable TV service, the ISP 15 is bundled into the subscription package.

The system 10 further includes a remote server 26 that receives the fingerprints generated by the fingerprint processor 16. The remote server 26 includes an automatic content recognition (ACR) system 28 which is configured to perform ACR on the received fingerprints. As is well-known in the art, the ACR system 28 includes search engine 30 and library of video content 32. The search engine 30 compares the received fingerprints to previously stored fingerprints of video content in the library of video content 32. When, or if, a match is found, the exact content associated with the fingerprint is identified. The search engine 30 is well-known in the art, and thus is not described further. See, for example, the discussion of a search engine in U.S. Pat. No. 10,108,718 (Kalampoukas et al.), which is incorporated by reference herein.

In an alternative embodiment (not shown), the fingerprint processor 16 is located in the ACR system 28 of the remote server 26. In this embodiment, the segment of video content (or a sampled portion thereof) is captured by segment capture device 17 located in the video display device 14, and is electronically communicated from the video display device 14 to the fingerprint processor 16 in the ACR system 28 of the remote server 26, and the same content recognition processing occurs as described above in the ACR system 28. This alternative embodiment requires additional bandwidth because transmitting fingerprints take up less bandwidth than transmitting video content segments. However, this embodiment may be preferred if it is not possible, or if it is logistically difficult, to install the fingerprint processor 16, or execute fingerprint processing, in the video display device 14.

The system 10 further requires the use of the user input device 20, which is preferably a conventional remote control device that receives input from the viewer via at least one of physical touch and voice commands.

The system 10 further includes viewing history database 40 for the plurality of viewers 1-n. Thus, over time, the system 10 build intelligence regarding what program content does a viewer like to watch, what times (time slots) does the viewer like to watch, and what genres of program content does the viewer like to watch during the different time slots.

FIG. 2B shows sample contents of the viewing history database 40 for viewer 1, which includes at least the following parameters and fields:

i. An identifier of video content that is broadcast or streamed to video display devices 14. The identifier may be designated by the indexer or by the source of the video content. Preferably, the library of video content 32 includes similar identifiers as the identifiers of video content in the video content database 40 so that any video content that a viewer indicates as being of interest will be identifiable. The library of video content 32 may be used to populate certain fields of the video content database 40.

ii. Type of video content (e.g., program, movie) and source of video content (e.g., network, streaming service)

iii. Description of video content. For a program, this would typically include the name of the program, and the season and episode in the case of a recurring TV program series. For a movie, this would typically include the name of the movie.

iv. Date/time of viewing. This is not necessarily the full length of the video content, but is only the time that the viewer was actually tuned to the video content. As discussed above, there are time slots of viewing activity, and each time slot includes one or more consecutive viewing time windows. In the example of FIG. 2B, there is a first time slot (Viewing Time-Slot) every weekday morning between 7:10 am-8:00 am, and a second time slot (Viewing Time-Slot) every weekday evening between 8:00 pm-9:00 pm. The first time slot has two consecutive viewing time windows (Viewing Time-Windows), namely, 7:10 am-7:30 am, and 7:30 am-8:00 am. The second time slot has only one viewing time window, which coincides with the time slot, namely, 8:00 pm-9:00 pm.

v. Primary Metadata (Content Details)

vi. Secondary Metadata (Content Details)

The system 10 further includes media source database 42 which stores the media sources that are available to each respective viewer. FIG. 2C shows sample contents of the media source database 42 for sample viewers 1 and 2, which includes at least the following fields:

i. channels (e.g., Verizon FIOS channel line-up, over-the-air (OTA) channels)

ii. OTT media services (e.g., Verizon FIOS VOD, Netflix, Hulu, Amazon Prime)

The media source database 42 is auto-populated by detecting such data from the video display device 14.

The system 10 further includes a rules engine 44 that is used to generate each viewer's personalized video channel, as discussed in further detail below.

The system 10 further includes an electronic table 46 that maintains a personalized video channel for each viewer 1-n. If, or when, a viewer is tuned to the personalized video channel, the programming listed in the respective viewer's table 46 is shown on the display of the viewer's video display device 14.

To build a viewer's personalized video channel for viewer 1, the rules engine 44 receives information regarding the viewing history of viewer 1 from the viewing history database 40, and the media sources that are available to viewer 1 from the media source database 42. The rules engine 44 includes rules to identify the viewer's most likely viewing times (time slots) and preferred program content within the time slots for dates in the near future, and then check the preferred program content against the available media sources. While a media source that the viewer recently accessed can be presumed to be available, there is no guarantee that the media source is still currently available. For example, cable channel lineups may change if a subscriber changes their package. Also, viewers often make changes to OTT media services, and the program content of OTT media services changes frequently.

When identifying a viewer's most likely time slots, approximations can be made from the sampled viewing data to select the viewer's intended time slots. For example, if the TV is tuned on between 6:50 am and 7:10 am most weekday mornings, and remains tuned to the same TV program for about 30 minutes, and that TV program begins at 7:00 am and ends at 9:00 am (e.g., NBC's TODAY show), the rules engine 44 is programmed with a rule to presume that the first time window in the morning time slot should be 7:00 am-7:30 am and the program content should be that particular TV program, assuming that it remains available to the viewer.

It is not necessary for the viewer to follow a consistent viewing pattern to identify the program content for the personalized video channel. A viewer's programming interests will likely change over time, The rules engine 44 is preferably programmed with rules to weight factors such as frequency and/or recency of watched program to select the most appropriate program content for a particular time window of the personalized video channel. Thus, the process for building a viewer's personalized video channel is preferably an iterative process that continuously repeats/refreshes.

The rules engine 44 is further programmed with rules to select "related" program content. As discussed above, related program content may be the same program content, but the current day's version of the program content (e.g., current live version of NBC's TODAY show); the same program content, but the next episode of the same program content (e.g., SEINFELD, episode <my next episode>). Program content may be related in other ways, such as by having similar metadata, such as the same genre (e.g., live football, teen comedy). Preferably, the related program content has an order of relation so that the most related program content is selected. Rules in the rules engine 44 define what is the "most related" program content. Examples of such rules are as follows:

IF metadata=NBC Today Show, AND metadata=daily live broadcast, THEN selection =[same program content]. Thus, the next day's live broadcast would be selected.

IF metadata=Big Bang Theory, AND metadata=season and episode data, THEN selection=[next sequential season and episode of same program content]. Thus, the next episode of Big Bang Theory would be selected.

IF metadata=live football, AND metadata=Eagles, AND metadata=professional football, THEN selection=[same program content]

IF metadata=movie, AND metadata=romantic comedy, THEN selection=[popular romantic comedy that the viewer has not watched in the past xx days]

The rules in the rules engine 44 also define what to select if the most related program content is not available. For example, if the Eagles game was watched for a number of consecutive Sundays, but the Eagles are not playing the following Sunday, the rules engine may be programmed to select another live, professional football game.

The rules in the rules engine 44 also define where the program content should be retrieved from. The program content is not necessarily retrieved from the same source as it came from during the sampling period. The same program content may be available from multiple sources. Examples of rules for selecting the program content source may include:

i. Select program content source that has least cost to the viewer, if any of the multiple program content sources require payment beyond the viewer's base subscription.

ii. Select commercial-free version of program content, if available.

iii. Select program content source that requires the least transmission bandwidth.

iv. Select program content source that has the highest resolution (e.g., HD vs. SD, 1080p or 720p vs. lower resolutions)

While the program content is known ahead of time, the exact program content source may be selected on-the-fly at the time of viewing using the rules engine 44, since the best source of the program content may change in even a short period of time.

FIG. 2D shows an example of the current day's program contents for a personalized video channel for viewer 1, referred to herein as "MyTvChannel." In one preferred embodiment, this channel appears in the EPG, alongside existing EPG channel data, and is selectable by the viewer in the same manner as any other channel shown in the EPG. See, for example, FIG. 2F which is discussed below.

In the embodiment of FIG. 2D, the personalized video channel is populated with program contents only during those time slots where the viewer is likely to be watching TV, and thus has blank time slots in between likely viewing times.

In another embodiment, shown in FIG. 2E, some or all of the blank time slots are filled with recommended program content. Preferably, the recommended program content is highlighted in some clear manner so that the viewer can quickly distinguish the two types of program content from each other.

In FIGS. 2D and 2E, the time windows that are populated with program contents are similar in length to the time windows set by the rules engine 44 based on the viewer's past viewing behavior. However, in one alternative embodiment, the time windows that are populated with program contents may be shorter in length than the time windows set by the rules engine 44 based on the viewer's past viewing behavior. This may occur if the system 10 is able to provide a commercial-free version of program content that normally has commercials. The commercial-free version may be available on-demand, or it may be created by a viewer's DVR equipment, or by program code in the OS 19, if permitted by the program content source. The program content text in MyTVChannel would be annotated to indicate that the program content is "commercial-free" (ad-free).

FIG. 2F further illustrates the relationship between a viewer's personalized video channel and the actual programming that is available for viewing during the same time periods for a single day. This example does not show the contents of the video content database 40 which resulted in the personalized video channel. For simplicity and illustration purposes, this example shows only the actual programming that is available for viewing for only the channels that also appear in the personalized video channel.

In this example, the viewer's MyTVChannel has two active time slots for the day, one between 7:10 am-7:55 am that has three time windows, and another one between 8:00 pm-9:00 pm having only one time window. In the first active time slot, program contents are as follows: The Weather Channel from 7:10 am-7:20 am, followed by 20 minutes of NBC's TODAY show, followed by 15 minutes of ABC's Good Morning America. In the second active time, the program content is an episode of The Marvelous Mrs. Maisel that is streamed from Amazon Prime. As also shown in FIG. 2F, the program contents being aired on the broadcast channels NBC and ABC extend for longer periods of time than the time windows that the respective program contents appear in the viewer's MyTVChannel. No programming is shown for Amazon Prime because it is an on-demand program content source.

Figure 2G:
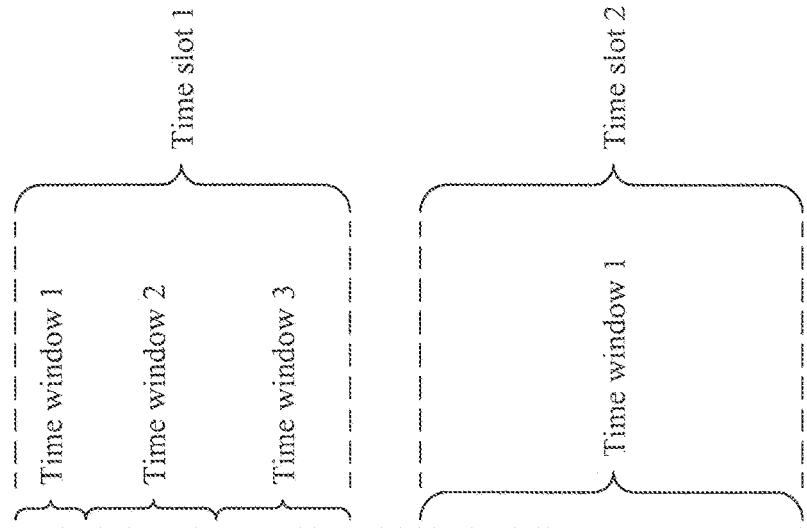

FIG. 2G is another visual depiction of a viewer's MyTVChannel shown in FIG. 2F for the current day's programming, with labeled time windows and time slots.

One benefit of the system 10 is that if there is any disruption in the programming schedule of a network, the personalized video channel can instantly replace the expected programming with alternative programming that is related to the viewer's expected program content. Consider, for example, that NBC's TODAY show is off the air on a particular weekday. Rather than tune to whatever content happens to be airing on NBC during the time window indicated by the personalized video channel (e.g., 7:20 am-7:40 am), the rules engine 44 may cause the personalized video channel may show a different daily live broadcast, such as Good Morning America, during that time window, since both programs have the same metadata of "daily live broadcast."

A. Operating System (OS) of Video Display Device 14

As discussed above, smart TVs and smart multi-media player devices run a complete operating system (OS) or mobile OS software that provides a platform for application developers. In one preferred embodiment of the present invention, the advanced functions of the video display device 14, such as sampling what a viewer is watching, creating fingerprints, capturing video segments, capturing EPG data, displaying the program contents of the personalized video channel (e.g., such as part of the EPG data), and allowing for the actual display of the personalized video channel, are implemented by program code (computer code) within its OS, labeled as OS 19 in FIGS. 2A-1 and 2A-2.

B. Virtual Channel Implementations

In one embodiment, the viewer's personalized video channel, which is referred to herein as "MyTvChannel" for the sake of this discussion, is not an actual, electronically tuned to TV channel, but instead is a virtual channel that switches in real time (e.g., preferably on the order of one second or less, so as to be comparable to channel changing using a conventional cable box) between the program content sources which provide the required program content for the respective time slots. From the viewer's perspective, it will appear as if the video display device 14 is simply tuned to a special channel, but in reality, the OS 19 of the video display device 14 is simulating that experience by rapidly switching among program content sources whenever a new time window within the time slot is encountered. Thus, whenever there are active time slots (i.e., time slots that are populated with program content), the virtual channel overrides whatever channel the video display device is currently tuned to.

C. Unused Channel Implementation

In another embodiment, MyTVChannel is an actual, electronically tuned to TV channel, such as an unused channel in a cable system's channel lineup (e.g., channel 9999 which is labeled as MyTVChannel). In this embodiment, the program channel source is redirected channel 9999, and then the viewer's cable box or its equivalent piece of hardware is automatically changed to channel 9999 during the active time slots. This embodiment is more complex than the virtual embodiment because it requires electronic manipulations of carrier signals for the program content, including modulation and demodulation steps. The virtual channel embodiment simply requires delivery of the program content in whatever native source it already exists in.

D. Use of EPG Data Instead of, or in Addition to, ACR Process for Identification of Video Content In one preferred embodiment of the present invention, the fingerprint processor 16 and the ACR system 28 (collectively, referred to herein as "the ACR process") work together to identify any aired or streamed video content that the viewer is watching.

In an alternative embodiment, the video content that the viewer is watching is identified by accessing EPG data 18 from the viewer's service provider or third-party source, and using the EPG data 18, instead of the ACR process. There are numerous advantages and disadvantages to this approach.

The main advantage of using EPG data is that the ACR process is processor-intensive and requires maintaining a large database of video content in the library 32 so that the ACR system 28 can accurately identify whatever video content that the viewer is watching, whereas the EPG data requires only a simple lookup function. However, using only EPG data has disadvantages. For example, EPG data cannot identify on-demand streaming video content.

In another alternative embodiment, EPG data and the ACR process are used together in the following manner:

1. The library of video content 32 maintains limited program content, thereby significantly reducing its size.

2. When program content needs to be identified, both EPG data and a fingerprint are sent to the remote server 26. If the ACR system 28 can properly identify the fingerprint, then the content of interest is presumed to be the identified program content. If the ACR system cannot properly identify the fingerprint, then the content of interest is presumed to be whatever program is indicated from the EPG data.

In yet another embodiment, if the video content of interest is identified by the ACR system 28 and is program content, the EPG data may be used to verify the correctness of the identification. If there is any discrepancies between the identified program content, the rules engine 44 includes rules to decide which information should be used (i.e., the results of the ACR system 28, or the EPG data).

The EPG data 18 shown in FIGS. 2A-1 and 2A-2 may represent locally stored EPG data, or EPG data that is being accessed in real-time from the viewer's service provider.

E. Data being Communicated from the Video Display Device 14 to the Remote Server 26

Referring again to FIGS. 2A-1 and 2A-2 and the various alternative embodiments described above, the types of data that may be communicated from the video display device 14 to the remote server 26 include at least the following data:

1. Fingerprints of the video content, or a segment of video content (or a sampled portion thereof) of interest, in the case where the fingerprint processor 16 is located in the ACR system 28 of the remote server 26. As discussed above, there are some embodiments wherein neither of these items are collected or communicated, such as when the EPG data is the sole source of information regarding the video content being watched. As also described above, fingerprints, in conjunction with the EPG, may be used to identify the video content.

2. EPG data, if fingerprints are not used as the primary or sole method of identifying the video content. A smart TV can identify the EPG data that is currently being viewed. In fact, an EPG is often used to directly select the channel being viewed.

3. Channel (which may be a streaming source, such as Netflix). In some embodiments, the source of the video content is extracted from the video display device 14. For example, the channel that an STB is tuned to may be communicated to the remote server 26. Alternatively, if a smart TV is showing a streaming movie from Netflix, the smart TV can communicate that fact to the remote server.

F. Viewer System Identification

Since each viewer has their own portion of the viewing history database 40 and personalized video channel, the system 10 must provide some way of identifying the viewer so that these elements are associated with the correct viewer. This can be implemented in any number of ways, which can be either passive or active. For example, one passive approach is for the remote server 26 to receive a unique device identifier of the video display device 14, and then create a portion of the viewing history database 40 and associated personalized video channel for each unique device identifier. One active approach would require login credentials to be inputted by the viewer when interacting with the video display device 14. These credentials are passed on to the remote server 26, and each portion of the viewing history database 40 and associated personalized video channel would then be associated with the viewer's login credentials. The active approach is more burdensome for the viewer (viewers do not typically log into a smart TV), but it would allow these elements to work across multiple video display devices 14. Since the passive approach cannot distinguish among viewers of the same video display device 14, each viewer's portion of the viewing history database 40 will include entries from all of viewers of the same video display device 14, and thus the personalized video channel for each video display device 14 would reflect program content viewed by any entity who interacts with the same video display device 14.

In another passive approach, a plurality of video display devices 14 within a single household may be associated with a single viewer account. That is, one viewer account may include the unique device identifiers of multiple video display devices 14 within a single household. The registration process may automatic, such as by detecting all video display devices 14 that are connected to the same wifi network that is part of a service provider's cable package, or the registration process may require manual user registration. Upon completion of the registration process, the portion of the viewing history database 40 for the household is populated whenever a viewer watches program content from any of the registered video display device 14 in the household. Likewise, the same personalized video channel appears on the display screens of all of the registered devices within the same household.

H. Sampling Periods

As discussed above, the system 10 automatically monitors and detects parameters of the viewer's viewing behavior with respect to one or more media devices that are associated with the viewer during one or more sampling periods. In one embodiment, the sampling period is an initial period of time that initiates the set-up of the personalized video channel, such as one month. Preferably, the viewers are made aware that their viewing behavior is being monitored for such a purpose.

In another embodiment, the sampling period is ongoing, and may be as inclusive as being all periods of time wherein the viewer is not tuned to their personalized video channel, or it may be periodic windows of time, such as once every six months for a one month period.

I. Tuning to and Away from Personalized Video Channel

Preferably, program code in the OS 19 allows the viewer to tune to, and tune away from, the personalized video channel (e.g., MyTvChannel) using the remote control 20, such as by pressing a channel up/down button, or by using voice activation (e.g., switch to NBC, switch to MyTVChannel). If the video display device 14 is being turned on during an active time slot (i.e., a time slot that is populated with program content), or if an active time slot occurs while the viewer is already watching program content that is not the same as the program content in the current time slot, then the video display device 14 would automatically tune to MyTvChannel, which as discussed above, may be implemented in a virtual manner, or via an unused channel.

J. Persistence of Personalized Video Channel, and Flexible Viewing of Same

As discussed above, in one embodiment, the personalized video channel is only tuned to if the current time matches an active time window. However, in another embodiment, if a viewer tunes away from the personalized video channel, or turns off the video display device 14, before the program content of an active time window is fully watched, and then the viewer tunes back to the personalized video channel within the same day, or turns on the video display device 14 again within the same day, the personalized video channel will continue playing program content from where it left off, even though the current time no longer matches the time of the active time window. In this manner, a viewer is allowed to conveniently complete their desired program content for the day, even if viewing was disrupted or cut short earlier in the day.

In yet another alternative embodiment, the current day's program contents of the personalized video channel may be watched whenever the viewer tunes to the personalized video channel, even if the current time does not match the time of the active time slot. In these embodiments, wherein viewing is delayed, the video display device 14 will preferably record any live program content that would have been consumed in real time, so that it is ready for consumption when the viewer is ready to watch it. If the active time slot has no live programming, the viewer may even consume the program content before the time of an active time slot. In this manner, the viewer is provided with flexibility regarding when the program content in active time slots of their personalized video channel can be consumed.

In yet another embodiment, the system 10 tracks whether the viewer consumed certain program content in the personalized video channel, and uses this data to selectively modify the next day's program contents. For example, in the case of a recurring TV program series, if a viewer missed the current day's episode, the missed episode may be automatically moved to the next day's program contents. Options would preferably be provided for the viewer to update episode data in case the viewer watched that program content somewhere else (i.e., on a non-monitored device), or wishes to skip it. For example, a pop-up menu may appear with the option to skip to the next episode or season. In fact, episode/season skipping options may be provided, even if the system 10 does not detect that the viewer missed the currently scheduled season/episode of a recurring TV program series.

K. Genre-Related Personalized Video Channel

In the embodiments described above, the genre of the program content may be used during the sampling periods to select related or recommended program content for the personalized video channel. However, in another embodiment, the genre may be used to create one or more specialized personalized video channels, such as MyMovieChannel, or MySportsChannel. One advantage of this embodiment is that if the active time slots include recommendations, the recommendations may be more closely tailored to the genre, than the recommendations that might appear when selecting recommendations for a single personalized video channel wherein all viewing behavior, and thus, multiple genres of program content, must be factored into the recommendation process. Also, if any of the above-described flexible viewing options are available, such as watching the active time slots at any other time in the day, the viewer can navigate directly to their favorite genre-related channel.

L. Audio-Based Media Content

While the preferred embodiments are described in the context of viewers, video content, video display devices, and video segments, the scope of the present invention also includes audio-only-based media content. In an audio-based embodiment, the viewer is a media consumer, the video content is media content, the video display device is a media device, the video segments are media segments, the video data stream is a media data stream, the personalized video channel is a personalized media channel, and the personalized media channel is aurally presented, instead of being displayed. Audio-based embodiments function in a similar manner as video-based embodiments, and only the descriptive verbiage needs to be substituted in the explanations above.

The present invention may be implemented with any combination of hardware and software. If implemented as a computer-implemented apparatus, the present invention is implemented using means for performing all of the steps and functions described above.

When implemented in software, the software code for the fingerprint processor 16, remote server 26, search engine 30, and rules engine 44 can be executed on any suitable processor or collection of processors, whether provided in a single computer or distributed among multiple computers.

The present invention can also be included in an article of manufacture (e.g., one or more non-transitory, tangible computer program products) having, for instance, computer readable storage media. The storage media has computer readable program code stored therein that is encoded with instructions for execution by a processor for providing and facilitating the mechanisms of the present invention. The article of manufacture can be included as part of a computer system or sold separately.

The storage media can be any known media, such as computer memory, one or more floppy discs, compact discs, optical discs, magnetic tapes, flash memories, circuit configurations in Field Programmable Gate Arrays or other semiconductor devices, or other tangible computer storage medium. The storage media can be transportable, such that the program or programs stored thereon can be loaded onto one or more different computers or other processors to implement various aspects of the present invention as discussed above. The storage media may also be implemented via network storage architecture, wherein many devices, which are paired together, are available to a network.

The computer(s) used herein for the fingerprint processor 16, remote server 26, search engine 30, and rules engine 44 may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable, mobile, or fixed electronic device.

At least the fingerprint processor 14 and the search engine 30 are not general-purpose computers, but instead are specialized computer machines that perform a myriad of video processing and search functions that are not native to a general-purpose computer, absent the addition of specialized programming.

The fingerprint processor 16, remote server 26, search engine 30, rules engine 44, video display devices $14_1$-$14_n$, viewing history database 40, media source database 42, and table 46 that maintains the personalized video channels may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

The terms "program" or "software" are used herein in a generic sense to refer to any type of computer code or set of computer-executable instructions that can be employed to program a computer or other processor to implement various aspects of the present invention as discussed above. The computer program need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, and the like, that perform particular tasks or implement particular abstract data types. The functionality of the program modules may be combined or distributed as desired in various embodiments.

Data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags, or other mechanisms that establish relationship between data elements.

Preferred embodiments of the present invention may be implemented as methods, of which examples have been provided. The acts performed as part of the methods may be ordered in any suitable way. Accordingly, embodiments may be constructed in which acts are performed in an order different than illustrated, which may include performing some acts simultaneously, even though such acts are shown as being sequentially performed in illustrative embodiments.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention.

What is claimed is:

1. A method of automatically generating personalized video channels for a plurality of different viewers, the method comprising for each viewer:
   (a) automatically monitoring and detecting parameters of the viewer's viewing behavior with respect to one or more media devices that are associated with the viewer during one or more sampling periods, the parameters including at least following parameters:
      (i) time slots of viewing activity, each time slot including (i) one viewing time window, or (ii) a plurality of consecutive viewing time windows, and
      (ii) program contents during the time slots of viewing activity, wherein the program contents during each consecutive viewing time window is detected,
      wherein a change in program contents occurs within each time window of a time slot;
   (b) the one or more media devices that are associated with the viewer automatically detecting all media content sources that are available to the viewer on the one or more media devices regardless of whether the viewer consumed any program contents from the available media content sources, the media content sources including both broadcasting media content sources, and on-demand media content sources, wherein the automatic detecting of all of the media content sources is performed using program code in the one or more media devices;
   (c) storing, in a media source database, all of the media content sources that were automatically detected by the one or more media devices regardless of whether the viewer consumed any program contents from the available media content sources, the media source database thereby storing for each viewer, all of the viewer's respective media content sources that are available to the respective viewer on the viewer's one or more media devices regardless of whether the viewer consumed any program contents from the available media content sources;
   (d) generating, using a rules engine, a personalized video channel for the viewer using at least the parameters and program contents available at all of the automatically detected media content sources stored for the viewer in the media source database, wherein the personalized video channel is populated with program contents for at least some of the viewing time slots that were detected during the monitoring as having viewing activity, and wherein the program contents for the viewing time slots of the personalized video channel are related to the program contents detected during the monitoring for the respective viewing time slots; and (e) displaying, during a viewing session on one of the media devices, the generated personalized video channel on the one or more media devices by automatically tuning to or automatically navigating to one of the media content sources that is currently presenting, or has available to present, the program contents that the personalized video channel was populated with for the viewing time slot that matches the current time, thereby allowing the viewer to experience the personalized video channel.

2. The method of claim 1 wherein the program contents for the respective time slots are provided from their respective media content sources, and wherein the one or more media devices automatically switches in a seamless manner between the media content sources when the program contents to be presented for a new time window of a time slot is provided from a media content source that is different from the media content source that the current program content is being provided from for the current time window.

3. The method of claim 1 wherein the program contents for the respective time slots are provided from their respective media content sources, and wherein an originally unused channel on the one or more media devices is assigned as the viewer's personalized video channel, and wherein the program contents for the respective time windows of the time slots are presented on the originally unused channel, the one or more media devices automatically redirecting the program contents from the respective media content sources to the originally unused channel in a seamless manner during successive time windows of the time slots.

4. The method of claim 1 wherein the personalized video channel is populated with program contents for only the viewing time slots that were detected during the monitoring as having viewing activity.

5. The method of claim 1 wherein the personalized video channel is populated with recommended program contents for one or more viewing time slots that were not detected during the monitoring as having any viewing activity.

6. The method of claim 1 wherein the on-demand media content sources are provided by (i) an over-the-top (OTT) media service which is related to an entity that provides at least some of the broadcasted media content sources, and (ii) one or more additional OTT media services that are independent from the entity that provides at least some of the broadcasted media content sources, and wherein the OTT media service and the one or more additional OTT media services are automatically detected and stored in the media source database.

7. A method of automatically generating personalized video channels for a plurality of different viewers, the method comprising for each viewer:

(a) automatically monitoring and detecting parameters of the viewer's viewing behavior with respect to one or more media devices that are associated with the viewer during one or more sampling periods, the parameters including at least following parameters:
   (i) time slots of viewing activity, each time slot including (i) one viewing time window, or (ii) a plurality of consecutive viewing time windows, and
   (ii) program contents during the time slots of viewing activity, wherein the program contents during each consecutive viewing time window is detected, wherein a change in program contents occurs within each time window of a time slot;

(b) automatically detecting media content sources that are available to the viewer on the one or more media devices, the media content sources including both broadcasting media content sources, and on-demand media content sources;

(c) generating, using a rules engine, a personalized video channel for the viewer using at least the parameters and program contents available at the automatically detected media content sources, wherein the personalized video channel is populated with program contents for at least some of the viewing time slots that were detected during the monitoring as having viewing activity, and wherein the program contents for the viewing time slots of the personalized video channel are related to the program contents detected during the monitoring for the respective viewing time slots;

(d) displaying, during a viewing session on one of the media devices, the generated personalized video channel on the one or more media devices by automatically tuning to or automatically navigating to one of the media content sources that is currently presenting, or has available to present, the program contents that the personalized video channel was populated with for the viewing time slot that matches the current time, thereby allowing the viewer to experience the personalized video channel; and (e) initiating a viewing session on the one or more media devices, and wherein upon initiation of the viewing session, tuning to the last tuned to channel when the personalized video channel is not populated with program contents for the current time, and tuning to one of the media content sources that is currently presenting, or has available to present, the program contents that the personalized video channel was populated with for the same time window of a viewing time slot that matches the current time when the personalized video channel is populated with program contents for the current time.

8. The method of claim 1 further comprising:
(f) iteratively performing steps (a) and (b), and performing the generating step (c) at periodic intervals, and wherein the generating in step (c) weights the viewer's most recent viewing behavior more heavily than less recent viewer behavior, thereby periodically updating the generated personalized video channel to reflect the viewer's most recent viewing behavior.

9. The method of claim 1 wherein the parameters further include:
(iii) genre of program contents.

10. The method of claim 1 wherein in step (e), the program contents detected during the monitoring of the viewing time slots and the program contents for the viewing time slots of the personalized video channel are related in one or more of the following ways:
(i) same program content, but current day's version of the program content, and
(ii) same program content, but next episode of the program content.

11. The method of claim 1 wherein in step (a), the program contents during the time of viewing is monitored and detected using automatic content recognition (ACR) by:
(i) creating a fingerprint, by a fingerprint processor, for a segment of each monitored content, and electronically communicating the fingerprint to a remote server, and
(ii) performing ACR in the remote server on the fingerprints, the remote server thereby identifying the program contents.

12. A system for automatically generating personalized video channels for a plurality of different viewers, the system comprising:
  (a) program code in one or more media devices that are associated with the viewer, the program code being configured to:
    (i) automatically monitor and detect parameters of the viewer's viewing behavior with respect to the one or more media devices during one or more sampling periods, the parameters including at least following parameters:
      (A) time slots of viewing activity, each time slot including (i) one viewing time window, or (ii) a plurality of consecutive viewing time windows, and
      (B) program contents during the time slots of viewing activity, wherein the program contents during each consecutive viewing time window is detected,
    wherein a change in program contents occurs within each time window of a time slot, and
    (ii) automatically detect all media content sources that are available to the viewer on the one or more media devices regardless of whether the viewer consumed any program contents from the available media content sources, the media content sources including both broadcasting media content sources, and on-demand media content sources;
  (b) a media source database that stores all of the media content sources that were automatically detected by the one or more media devices regardless of whether the viewer consumed any program contents from the available media content sources, the media source database thereby storing for each viewer, all of the viewer's respective media content sources that are available to the respective viewer on the viewer's one or more media devices regardless of whether the viewer consumed any program contents from the available media content sources; and
  (c) a rules engine configured to generate a personalized video channel for the viewer using at least the parameters and program contents available at all of the automatically detected media content sources stored for the viewer in the media source database, wherein the personalized video channel is populated with program contents for at least some of the viewing time slots that were detected during the monitoring as having viewing activity, and wherein the program contents for the viewing time slots of the personalized video channel are related to the program contents detected during the monitoring for the respective viewing time slots,
    wherein the program code in the one or more media devices is further configured to:
    (iii) display, during a viewing session on one of the media devices, the generated personalized video channel on the one or more media devices by automatically tuning to or automatically navigating to one of the media content sources that is currently presenting, or has available to present, the program contents that the personalized video channel was populated with for the viewing time slot that matches the current time, thereby allowing the viewer to experience the personalized video channel.

13. The system of claim 12 wherein the program contents for the respective time slots are provided from their respective media content sources, and wherein the program code is further configured to automatically switch the one or more media devices in a seamless manner between the media content sources when the program contents to be presented for a new time window of a time slot is provided from a media content source that is different from the media content source that the current program content is being provided from for the current time window.

14. The system of claim 12 wherein the program contents for the respective time slots are provided from their respective media content sources, and wherein an originally unused channel on the one or more media devices is assigned as the viewer's personalized video channel, and wherein the program contents for the respective time windows of the time slots are presented on the originally unused channel, and wherein the program code is further configured to automatically redirect the program contents from the respective media content sources to the originally unused channel in a seamless manner during successive time windows of the time slots.

15. The system of claim 12 wherein the personalized video channel is populated with program contents for only the viewing time slots that were detected during the monitoring as having viewing activity.

16. The system of claim 12 wherein the personalized video channel is populated with recommended program contents for one or more viewing time slots that were not detected during the monitoring as having any viewing activity.

17. The system of claim 12 wherein the parameters further include:
  (iii) genre of program contents.

18. The system of claim 12 wherein the program contents detected during the monitoring of the viewing time slots and the program contents for the viewing time slots of the personalized video channel are related in one or more of the following ways:
  (i) same program content, but current day's version of the program content, and
  (ii) same program content, but next episode of the program content.

19. The system of claim 12 wherein the program contents during the time of viewing is monitored and detected using automatic content recognition (ACR), the system further comprising:
  (c) a remote server configured to perform automatic content recognition (ACR),
    wherein the program code is further configured to create a fingerprint, by a fingerprint processor, for a segment of each monitored content, and electronically communicate the fingerprint to a remote server, and
    wherein the remote server is configured to perform ACR on the fingerprints, the remote server thereby identifying the program contents.

20. The system of claim 12 wherein the on-demand media content sources are provided by (i) an over-the-top (OTT) media service which is related to an entity that provides at least some of the broadcasted media content sources, and (ii) one or more additional OTT media services that are independent from the entity that provides at least some of the broadcasted media content sources, and wherein the OTT media service and the one or more additional OTT media services are automatically detected and stored in the media source database.

21. A system for automatically generating personalized video channels for a plurality of different viewers, the system comprising:

(a) program code in one or more media devices that are associated with the viewer, the program code being configured to:
   (i) automatically monitor and detect parameters of the viewer's viewing behavior with respect to the one or more media devices during one or more sampling periods, the parameters including at least following parameters:
      (A) time slots of viewing activity, each time slot including (i) one viewing time window, or (ii) a plurality of consecutive viewing time windows, and
      (B) program contents during the time slots of viewing activity, wherein the program contents during each consecutive viewing time window is detected,
      wherein a change in program contents occurs within each time window of a time slot, and
   (ii) automatically detect media content sources that are available to the viewer on the one or more media devices, the media content sources including both broadcasting media content sources, and on-demand media content sources; and
(b) a rules engine configured to generate a personalized video channel for the viewer using at least the parameters and program contents available at the automatically detected media content sources, wherein the personalized video channel is populated with program contents for at least some of the viewing time slots that were detected during the monitoring as having viewing activity, and wherein the program contents for the viewing time slots of the personalized video channel are related to the program contents detected during the monitoring for the respective viewing time slots
   wherein the program code in the one or more media devices is further configured to:
   (iii) display, during a viewing session on one of the media devices, the generated personalized video channel on the one or more media devices by automatically tuning to or automatically navigating to one of the media content sources that is currently presenting, or has available to present, the program contents that the personalized video channel was populated with for the viewing time slot that matches the current time, thereby allowing the viewer to experience the personalized video channel, and
   (iv) initiate a viewing session on the one or more media devices, and wherein upon initiation of the viewing session, the program code is configured to tune to the last tuned to channel when the personalized video channel is not populated with program contents for the current time, and tune to one of the media content sources that is currently presenting, or has available to present, the program contents that the personalized video channel was populated with for the same time window of a viewing time slot that matches the current time when the personalized video channel is populated with program contents for the current time.

* * * * *